United States Patent
Hwang et al.

(10) Patent No.: US 10,884,921 B2
(45) Date of Patent: Jan. 5, 2021

(54) STORAGE DEVICE PERFORMING GARBAGE COLLECTION AND GARBAGE COLLECTION METHOD OF STORAGE DEVICE

(71) Applicant: Samsung Electronics Co., Ltd., Suwon-si (KR)

(72) Inventors: In-Tae Hwang, Hwaseong-si (KR); Ju-Young Lee, Seoul (KR); Won-Jin Lim, Seoul (KR); Sung-Hyun Cho, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 111 days.

(21) Appl. No.: 16/146,339

(22) Filed: Sep. 28, 2018

(65) Prior Publication Data
US 2019/0196966 A1 Jun. 27, 2019

(30) Foreign Application Priority Data

Dec. 22, 2017 (KR) .......................... 10-2017-0177907

(51) Int. Cl.
*G06F 12/02* (2006.01)
*G06F 12/10* (2016.01)

(52) U.S. Cl.
CPC .......... *G06F 12/0253* (2013.01); *G06F 12/10* (2013.01); *G06F 2212/1044* (2013.01); *G06F 2212/7201* (2013.01); *G06F 2212/7205* (2013.01)

(58) Field of Classification Search
CPC ......... G06F 12/0253; G06F 2212/1044; G06F 2212/7201; G06F 2212/7205; G06F 12/0246; G06F 12/1009; G06F 12/10
See application file for complete search history.

(56) References Cited

U.S. PATENT DOCUMENTS

| 7,890,550 | B2 * | 2/2011 | Jung ................... | G06F 12/0246 707/813 |
| 9,244,619 | B2 * | 1/2016 | Lee ....................... | G06F 3/0613 |
| 9,483,181 | B2 | 11/2016 | Kim et al. | |
| 9,652,164 | B2 | 5/2017 | Rose | |
| 2005/0174849 | A1 * | 8/2005 | In ........................ | G06F 12/0246 365/185.11 |
| 2009/0319720 | A1 * | 12/2009 | Stefanus ............. | G06F 12/0246 711/103 |

(Continued)

*Primary Examiner* — David Yi
*Assistant Examiner* — Dustin B. Fulford
(74) *Attorney, Agent, or Firm* — Harness, Dickey and Pierce, P.L.C.

(57) ABSTRACT

A storage device includes at least one nonvolatile memory device including a plurality of memory blocks, the nonvolatile memory device configured to store user data and meta data in the plurality of memory blocks, and a device controller configured to control the nonvolatile memory device, to calculate a user cost corresponding to a time of memory accesses to the user data to be performed at garbage collection with respect to each of the plurality of memory blocks, to calculate a meta cost corresponding to a time of memory accesses to the meta data to be performed at the garbage collection with respect to each of the plurality of memory blocks, to select a victim block among the plurality of memory blocks based on the user cost and the meta cost, and to perform the garbage collection on the victim block.

19 Claims, 14 Drawing Sheets

(56) References Cited

U.S. PATENT DOCUMENTS

| | | |
|---|---|---|
| 2012/0030260 A1 | 2/2012 | Lu et al. |
| 2016/0062885 A1 | 3/2016 | Ryu |
| 2016/0124848 A1 | 5/2016 | Bellorado et al. |
| 2016/0179386 A1 | 6/2016 | Zhang |
| 2017/0039141 A1 | 2/2017 | Yeh et al. |
| 2017/0185335 A1 | 6/2017 | Pardoe |

\* cited by examiner

| | BLKA | BLKB |
|---|---|---|
| VPC | 100 | 110 |
| RLC | 50 | 5 |

| | BLKC | BLKD |
|---|---|---|
| VPC | 100 | 100 |
| RLC | 50 | 5 |

STORAGE DEVICE PERFORMING GARBAGE COLLECTION AND GARBAGE COLLECTION METHOD OF STORAGE DEVICE

CROSS-REFERENCE TO RELATED APPLICATIONS

This U.S. non-provisional application claims the benefit of priority under 35 U.S.C. § 119 to Korean Patent Application No. 10-2017-0177907 filed on Dec. 22, 2017 in the Korean Intellectual Property Office (KIPO), the entire disclosure of which is incorporated by reference herein in its entirety.

BACKGROUND

1. Technical Field

Example embodiments of the present inventive concepts relate to storage devices. For example, storage devices performing garbage collection and/or garbage collection methods of the storage devices.

2. Description of the Related Art

Recently, a storage device employing a nonvolatile memory device, such as a solid state drive (SSD), a nonvolatile memory express (NVMe), an embedded multimedia card (eMMC), a universal flash storage (UFS), etc., has been widely used. This storage device has advantages, such as the absence of moving mechanical parts, higher data access speeds, improved stability and durability, low power consumption, etc. In the nonvolatile memory device, such as a flash memory, included in the storage device, an erase operation may be performed before a write operation. Further, in the flash memory, write operations are performed on a page basis, while erase operations are performed on a block basis, where each block includes a number of pages.

As data are continuously written to the flash memory, the data may become scattered over the entire flash memory. In this case, to obtain a free memory block, or a storage space to which data can be written, a garbage collection may be performed to move an effective page of one memory block to another memory block and erase the one memory block.

SUMMARY

Some example embodiments provide a storage device that performs garbage collection.

Some example embodiments provide a garbage collection method of a storage device that performs garbage collection.

According to example embodiments, a storage device includes at least one nonvolatile memory device including a plurality of memory blocks, the nonvolatile memory device configured to store user data and meta data in the plurality of memory blocks; and a device controller configured to, calculate a user cost corresponding to a time of memory accesses to the user data during garbage collection within the plurality of memory blocks, calculate a meta cost corresponding to a time of memory accesses to the meta data during the garbage collection within the plurality of memory blocks, select a victim block among the plurality of memory blocks based on the user cost and the meta cost, and perform the garbage collection on the victim block.

According to example embodiments, a storage device includes at least one nonvolatile memory device including a plurality of memory blocks, the nonvolatile memory device configured to store user data and meta data in the plurality of memory blocks; and a device controller configured to control the nonvolatile memory device, the device controller including, at least one memory configured to store user cost information for each of the plurality of memory blocks, and to store meta cost information for each of the plurality of memory blocks, and processing circuitry configured to, calculate a user cost corresponding to a time of memory accesses to the user data during garbage collection within the plurality of memory blocks based on the user cost information, calculate a meta cost corresponding to a time of memory accesses to the meta data during the garbage collection within the plurality of memory blocks based on the meta cost information, calculate a garbage collection cost per free page of each of the plurality of memory blocks based on the user cost and the meta cost, and select one of the plurality of memory blocks having a lowest garbage collection cost per free page as a victim block.

Some example embodiments relate to a garbage collection method of a storage device, the storage device including at least one nonvolatile memory device including a plurality of memory blocks. The method may include calculating a user cost corresponding to a time of memory accesses to user data stored in the nonvolatile memory device during garbage collection within the plurality of memory blocks; calculating a meta cost corresponding to a time of memory accesses to meta data stored in the nonvolatile memory device during the garbage collection within the plurality of memory blocks; calculating a garbage collection cost per free page of each of the plurality of memory blocks based on the user cost and the meta cost; selecting one of the plurality of memory blocks having a lowest garbage collection cost per free page as a victim block; and performing the garbage collection on the victim block.

As described above, the storage device and the garbage collection method of the storage device according to example embodiments may select a memory block having a lowest garbage collection cost per free page as a victim block by calculating not only a user cost but also a meta cost, thereby relatively more efficiently performing garbage collection.

Further, the storage device and the garbage collection method of the storage device according to example embodiments may set a time period for the garbage collection by using the garbage collection cost per free page calculated by considering not only the user cost but also the meta cost, thereby reducing a latency (e.g., a write latency) of the storage device.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
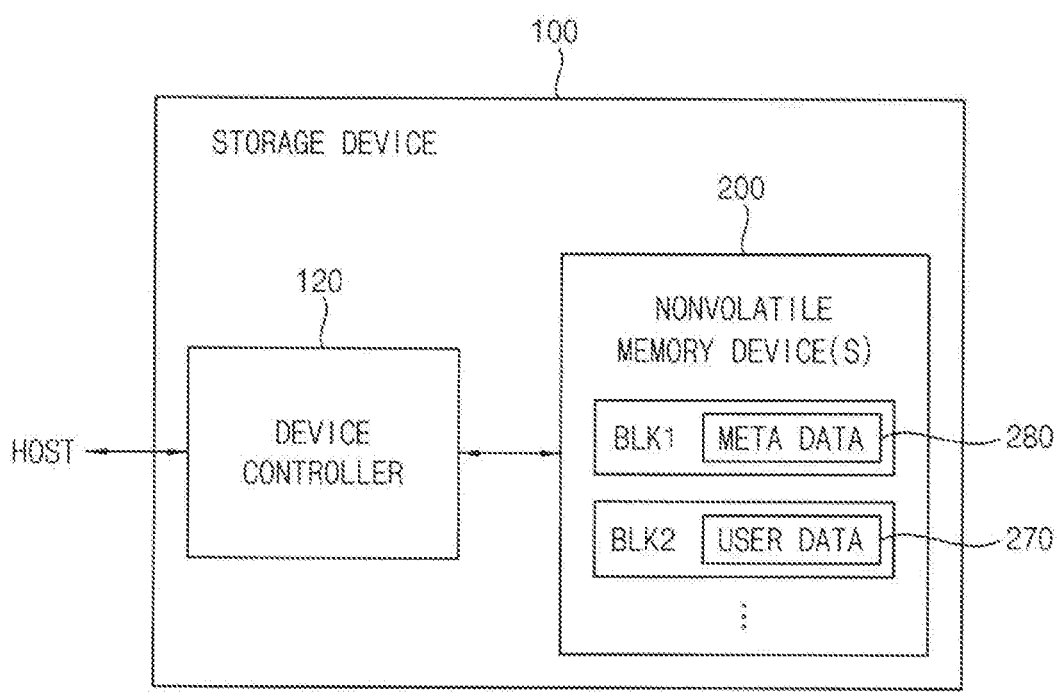
FIG. 1 is a block diagram illustrating a storage device according to example embodiments.
Figure 2:
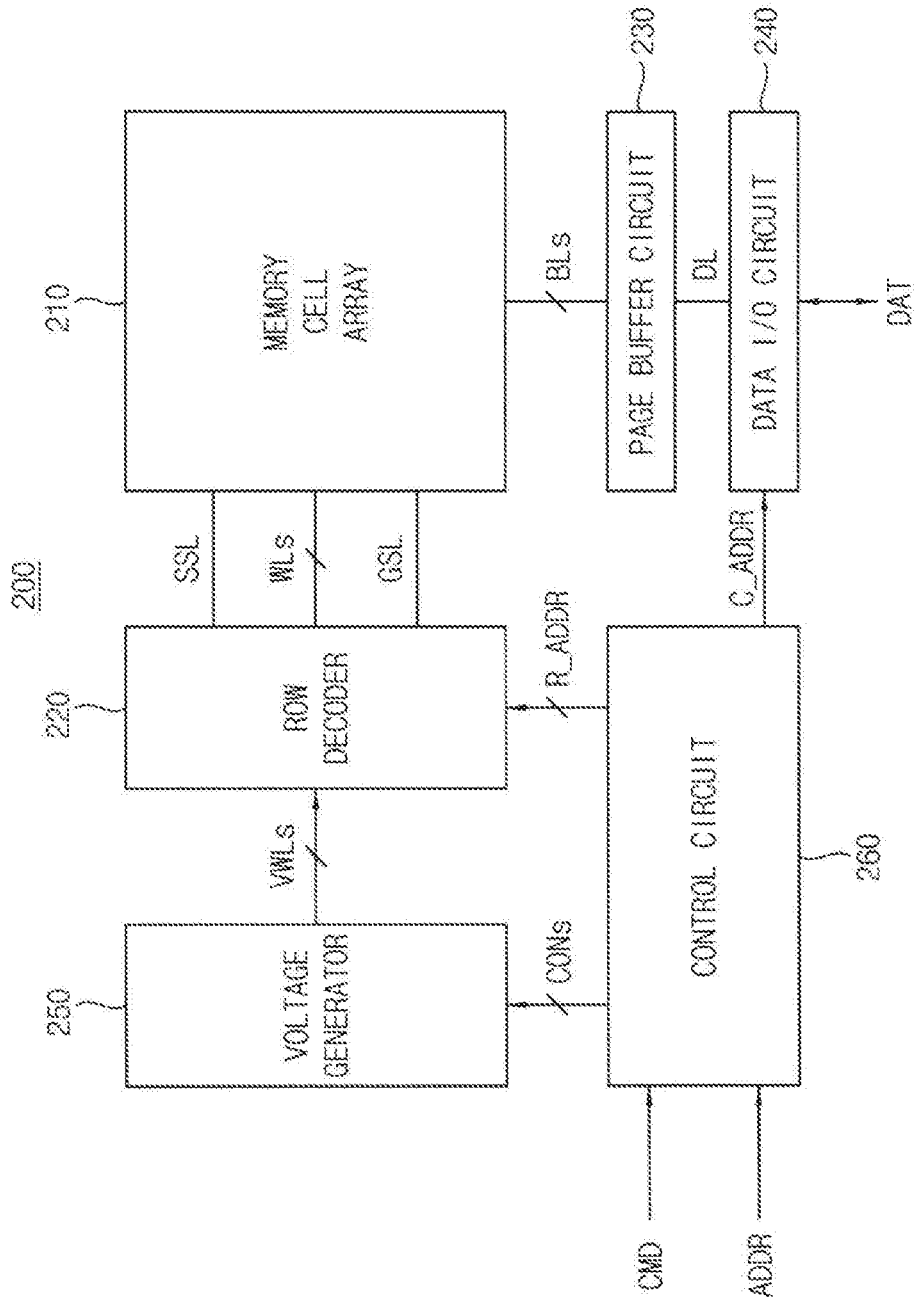
FIG. 2 is a block diagram illustrating an example of a nonvolatile memory device included in a storage device of FIG. 1.
Figure 3A:
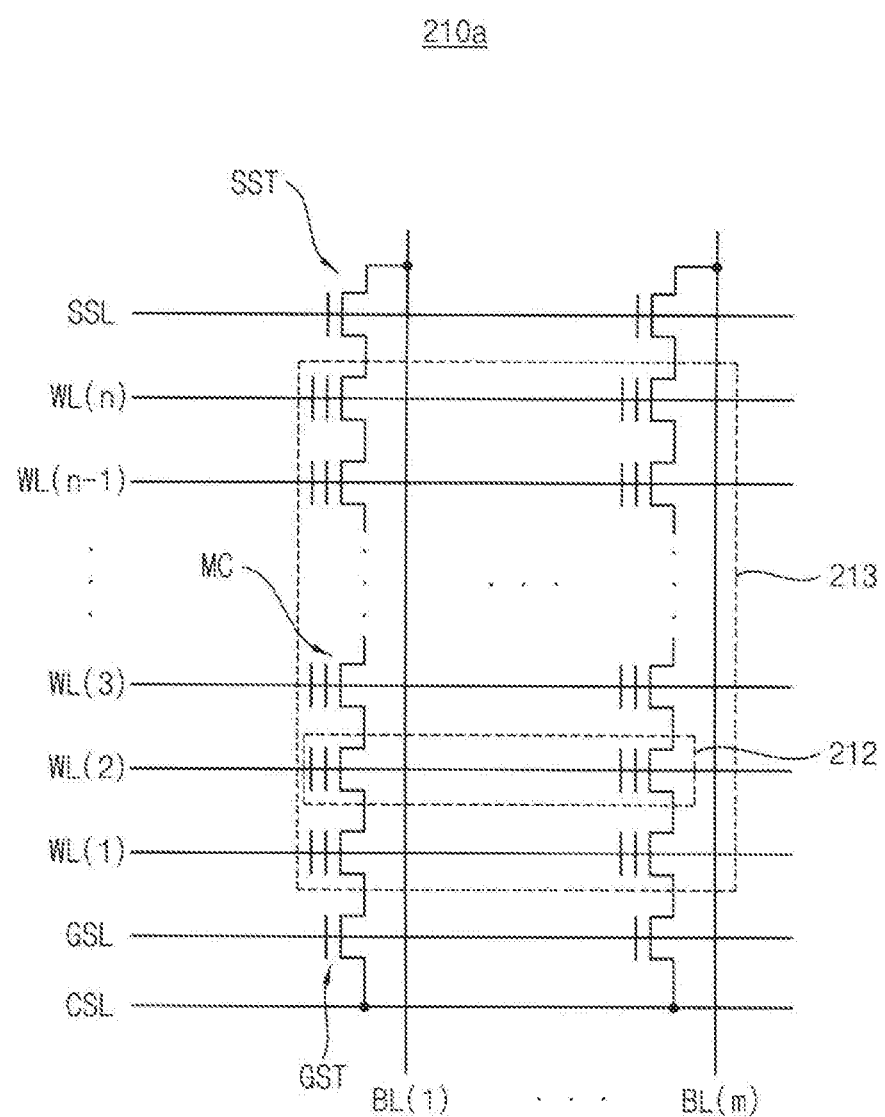
FIG. 3A is a circuit diagram illustrating an example of a memory cell array included in a nonvolatile memory device of FIG. 2.
Figure 3B:
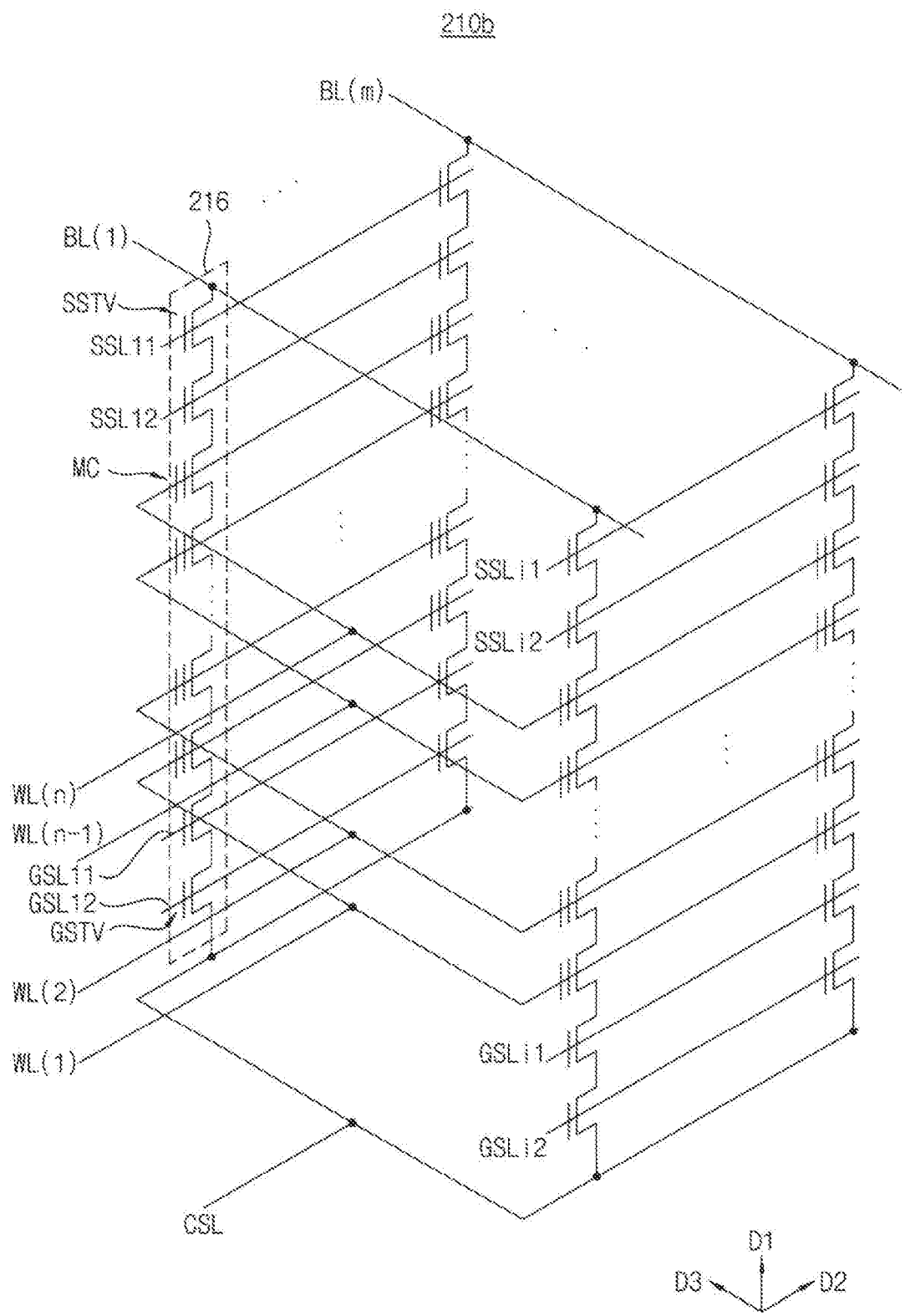
FIG. 3B is a circuit diagram illustrating another example of a memory cell array included in a nonvolatile memory device of FIG. 2.

FIG. 1 is a block diagram illustrating a storage device according to example embodiments, FIG. 2 is a block diagram illustrating an example of a nonvolatile memory device included in a storage device of FIG. 1, FIG. 3A is a circuit diagram illustrating an example of a memory cell array included in a nonvolatile memory device of FIG. 2, and FIG. 3B is a circuit diagram illustrating another example of a memory cell array included in a nonvolatile memory device of FIG. 2.

Referring to FIG. 1, a data device 100 according to example embodiments includes at least one nonvolatile memory device 200 including a plurality of memory blocks BLK1 and BLK2, and a device controller 120 that controls the nonvolatile memory device 200. The storage device 100 may be any storage device performing garbage collection, such as a solid state drive (SSD), a nonvolatile memory express (NVMe), an embedded multi-media card (eMMC), a universal flash storage (UFS), etc.

Referring to FIG. 2, the nonvolatile memory device 200 may include a memory cell array 210, a row decoder 220, a page buffer circuit 230, a data input/output (I/O) circuit 240, a voltage generator 250 and a control circuit 260.

The memory cell array 210 may be coupled to the row decoder 220 through a string select line SSL, a plurality of word lines WLs and a ground select line GSL. The memory cell array 210 may be further coupled to the page buffer circuit 230 through a plurality of bit lines BLs. The memory cell array 210 may be divided into the plurality of memory blocks BLK1 and BLK2 as illustrated in FIG. 1, and each memory block BLK1 and BLK2 may include a plurality of nonvolatile memory cells coupled to the plurality of word lines WLs and the plurality of bit lines BLs.

In some example embodiments, the memory cell array 210 may be a two dimensional memory cell array formed in a two dimensional structure (or a horizontal structure) on a substrate. For example, as illustrated in FIG. 3A, the memory cell array 210a may include string select transistors SST, ground select transistors GST and memory cells MC. The string select transistors SST may be coupled to bit lines BL(1) and BL(m), and the ground select transistors GST may be coupled to a common source line CSL. The memory cells MC in the same string may be arranged in series between a corresponding one of the bit lines BL(1) and BL(m) and the common source line CSL. The memory cells MC in the same row may be coupled to a corresponding one of word lines WL(1), WL(2), WL(3), WL(n-1) and WL(n). Thus, the memory cells MC may be coupled in series between the string select transistors SST and the ground select transistors GST, and, for example, 16, 32 or 64 word lines WL(1) through WL(n) may be disposed between the string select line SSL and the ground select line GSL. The string select transistors SST may be coupled to the string select line SSL, and may be controlled according to a level of a voltage applied to the string select line SSL. The ground select transistors GST may be coupled to the ground select line GSL, and may be controlled according to a level of a voltage applied to the ground select line GSL. The memory cells MC may be controlled according to levels of voltages applied to the word lines WL(1) through WL(n). The nonvolatile memory device 200 including the memory cell array 210a may perform a write (or program) operation and a read operation on a page 212 basis, and may perform an erase operation on a block 213 basis.

In other example embodiments, the memory cell array 210 may be a three dimensional memory cell array formed in a three dimensional structure (or a vertical structure) on a substrate. For example, as illustrated in FIG. 3B, the memory cell array 210b may include a plurality of strings 216 having a vertical structure. The plurality of strings 216 may be formed in a second direction D2 such that a string row may be formed. A plurality of string rows may be formed in a third direction D3 such that a string array may be formed. Each of the strings 216 may include ground selection transistors GSTV, memory cells MC, and string selection transistors SSTV which are disposed in series in a first direction D1 between bit lines BL(1), . . . , BL(m) and a common source line CSL. The ground selection transistors GSTV may be connected to ground selection lines GSL11, GSL12, . . . , GSLi1, GSLi2, and the string selection transistors SSTV may be connected to string selection lines SSL11, SSL12, . . . , SSLi1 and SSLi2. The memory cells MC arranged on the same layer may be connected in common to one of word lines WL(1), WL(2), . . . , WL(n-1) and WL(n). The ground selection lines GSL11 through GSLi2 and the string selection lines SSL11 through SSLi2 may extend in the second direction D2 and may be formed along the third direction D3. The word lines WL(1) through WL(n) may extend in the second direction D2 and may be formed along the first and third directions D1 and D3. The bit lines BL(1) through BL(m) may extend in the third direction D3 and may be formed along the second direction D2. The memory cells MC may be controlled according to levels of voltages applied to the word lines WL(1) through WL(n). The following patent documents, which are hereby incorporated by reference in their entireties, describe suitable configurations for a memory cell array including a 3D vertical array structure, in which the 3D memory array is configured as a plurality of levels, with word lines and/or bit lines shared between levels: U.S. Pat. Nos. 7,679,133, 8,553,466, 8,654,587, and 8,559,235, and US Pat. Pub. No. 2011/0233648.

Although examples of the memory cell arrays 210a and 210b included in the nonvolatile memory device 200 according to example embodiments are described based on a NAND flash memory device, the nonvolatile memory device according to example embodiments may be any nonvolatile memory device, e.g., a phase random access memory (PRAM), a resistive random access memory (RRAM), a nano floating gate memory (NFGM), a polymer random access memory (PoRAM), a magnetic random access memory (MRAM), a ferroelectric random access memory (FRAM), a thyristor random access memory (TRAM), etc.

Referring again to FIG. 2, the control circuit 260 may receive a command CMD and an address ADDR from the device controller 120 in FIG. 1, and may control the row decoder 220, the page buffer circuit 230, the data I/O circuit 240 and the voltage generator 250 based on the command CMD and the address ADDR to perform write (or program), read and erase operations for the memory cell array 210. For example, the control circuit 260 may generate control signals CONs for controlling the voltage generator 250 based on the command CMD, and may generate a row address R_ADDR and a column address C_ADDR based on the address ADDR. The control circuit 260 may provide the row address R_ADDR to the row decoder 220, and may provide the column address C_ADDR to the data I/O circuit 240.

The row decoder 220 may be connected to the memory cell array 210 via the string selection line SSL, the plurality of word lines WLs and the ground selection line GSL. The row decoder 220 may determine at least one of the plurality of word lines WLs as a selected word line, and may determine the rest of the plurality of word lines WLs as unselected word lines, based on the row address R_ADDR.

The voltage generator 250 may generate word line voltages VWLs that are required for an operation of the nonvolatile memory device 200 based on the control signals CONs. The word line voltages VWLs may be applied to the plurality of word lines WLs via the row decoder 220. For example, during the erase operation, the voltage generator 250 may apply an erase voltage to a well or a common source line of a memory block, and may apply a ground voltage to entire word lines of the memory block. During an erase verification operation, the voltage generator 250 may apply an erase verification voltage to all of the word lines of the memory block or sequentially apply the erase verification voltage on a word line-by-word line basis. During the program operation (or the write operation), the voltage generator 250 may apply a program voltage to the selected word line, and may apply a program pass voltage to the unselected word lines. During a program verification operation, the voltage generator 250 may apply a program verification voltage to the selected word line, and may apply a verification pass voltage to the unselected word lines. During the read operation, the voltage generator 250 may apply a read voltage to the selected word line, and may apply a read pass voltage to the unselected word lines.

The page buffer circuit 230 may be connected to the memory cell array 210 via the plurality of bit lines BLs. The page buffer circuit 230 may include a plurality of page buffers. In some example embodiments, each page buffer may be connected to one bit line. In other example embodiments, each page buffer may be connected to two or more bit lines. The page buffer circuit 230 may store data DAT to be programmed into the memory cell array 210 or may read data DAT sensed from the memory cell array 210. In other words, the page buffer circuit 230 may operate as a write driver or a sensing amplifier according to an operation mode of the nonvolatile memory device 200.

The data I/O circuit 240 may be connected to the page buffer circuit 230 via a data line DL. The data I/O circuit 240 may provide the data DAT from an outside of the nonvolatile memory device 200 (e.g., from the device controller 120 in FIG. 1) to the memory cell array 210 via the page buffer circuit 230 or may provide the data DAT from the memory cell array 210 to the outside of the nonvolatile memory device 100, based on the column address C_ADDR.

Referring again to FIG. 1, the device controller 120 may include a memory and processing circuitry.

The memory may include at least one of a volatile memory, non-volatile memory, random access memory (RAM), a flash memory, a hard disk drive, and an optical disk drive. The memory may store a user cost table 140 and a meta cost table 150 illustrated in FIG. 4.

The processing circuitry may be, but not limited to, a processor, Central Processing Unit (CPU), a controller, an arithmetic logic unit (ALU), a digital signal processor, a microcomputer, a field programmable gate array (FPGA), an Application Specific Integrated Circuit (ASIC), a System-on-Chip (SoC), a programmable logic unit, a microprocessor, or any other device capable of performing operations in a defined manner.

The processing circuitry may be configured, through a layout design or execution of computer readable instructions stored in a memory (not shown), as a special purpose computer to control the operation of the non-volatile memory device 200. Further, as discussed below, the processing circuitry (including a cost calculator 160 illustrated in FIG. 4) may be configured to calculate a meta cost associated with memory accesses to meta data during garbage collection, and select a victim block in consideration of the meta cost. Accordingly, the device controller 120 may improve the functioning of the storage device 100 itself by improving the garbage collection of the storage device 100.

The device controller 120 may control operations of the nonvolatile memory device 200 based on a command and data received from a host. For example, the device controller 120 may receive user data 270 and a write command requesting a write operation for the user data 270 from the host, and may control the nonvolatile memory device 200 to program the user data 270 in the plurality of memory blocks BLK1 and BLK2.

Further, the device controller 120 may execute a firmware for operating the storage device 100, and may generate meta data 280 used in operating the firmware. The meta data 280 may be data for managing the nonvolatile memory device 200, and may include management information for the user data 270. For example, the meta data 280 may include a logical-to-physical (L2P) mapping table having address conversion information from a logical address to a physical address with respect to the user data 270. The meta data 280 may further include garbage collection progress information, such as copyback progress information, a previous garbage collection time, etc. Because of a capacity limitation of a cache or an operating memory of the device controller 120, or to prepare for sudden shutdown, the device controller 120 may store the meta data 280 in at least one of the plurality of memory blocks BLK1 and BLK2. Thus, the device controller 120 may load the meta data 280 from the nonvolatile memory device 200 into the cache or the operating memory when needed, and, when the meta data 280 are changed, may program the changed meta data 280 to at least one of the plurality of memory blocks BLK1 and BLK2. The L2P mapping table may be stored in a plurality of pages in at least one BLK1 of the plurality of memory blocks BLK1 and BLK2, and, here, each page storing the address conversion information may be referred to as an "L2P mapping page". The device controller 120 may read or program the address conversion information on an L2P mapping page basis.

In the nonvolatile memory device 200, such as a flash memory, to write new data to a region to which other data (e.g., the user data 270) are already written, an erase operation for the region should be previously performed (i.e., the new data may not be overwritten to the region), and write operations are performed on a page basis while erases operations are performed on a block basis, where each block includes a number of pages. Thus, as the user data 270 are continuously written to the plurality of memory blocks BLK1 and BLK2 in response to write requests from the host, valid data may become scattered over the entire memory blocks BLK1 and BLK2, and a storage space to which new data can be written, or a free block may become insufficient. Accordingly, to obtain the free block, the device controller 120 may perform garbage collection that selects a victim block among the plurality of memory blocks BLK1 and BLK2, moves (or copybacks) valid pages of the victim block to another memory block, and performs an erase operation for the victim block.

To perform the garbage collection, the device controller 120 may calculate a user cost with respect to each of the plurality of memory blocks BLK1 and BLK2 (or with respect to each of memory blocks storing the user data 270 among the plurality of memory blocks BLK1 and BLK2). Here, the user cost may correspond to a time of memory accesses to the user data 270 to be performed at the garbage collection, and may include a time for reading valid pages of each memory block BLK1 and BLK2 and a time for programming the read valid pages to another memory block. In some example embodiments, the device controller 120 may calculate the user cost based on at least one of the number of valid pages of each memory block BLK1 and BLK2, a cell type of each memory block BLK1 and BLK2, the number of erase operations of each memory block BLK1 and BLK2, and a type of the user data 270 stored in each memory block BLK1 and BLK2.

Further, the device controller 120 may calculate a meta cost with respect to each of the plurality of memory blocks BLK1 and BLK2. Here, the meta cost may correspond to a time of memory accesses to the meta data 280 to be performed at the garbage collection, and may include a time for reading L2P mapping pages including address conversion information for valid pages included in each memory block BLK1 and BLK2 among a plurality of L2P mapping pages of the L2P mapping table and a time for programming L2P mapping pages including address conversion information changed by a copyback operation. In some example embodiments, the device controller 120 may calculate the meta cost based on at least one of the number of L2P mapping pages related to valid pages of each memory block BLK1 and BLK2, and garbage collection progress information.

The device controller 120 may select a victim block among the plurality of memory blocks BLK1 and BLK2 based on the user cost and the meta cost. In some example embodiments, the device controller 120 may calculate, with respect to each of the plurality of memory blocks BLK1 and BLK2, a garbage collection cost per free page by dividing a sum of the user cost and the meta cost by the number of invalid pages of each memory block BLK1 and BLK2, and may select one of the plurality of memory blocks BLK1 and BLK2 having the lowest garbage collection cost per free page as the victim block.

Further, the device controller 120 may perform the garbage collection on the victim block. That is, the device controller 120 may read valid pages of the victim block, may program (or copyback) the read valid pages to another block (e.g., a free block), and may erase the victim block. The erased victim block may be used as a free block.

A conventional storage device may select a memory block having the lowest number of valid pages as the victim block. However, although the number of valid pages of each memory block may be proportional to a time of a copyback operation that is a portion of a time required for garbage collection, the number of valid pages may not be proportional to a time (or a search valid time) for reading L2P mapping pages related to the valid pages of the victim block and a time (or a meta update time) for programming updated L2P mapping pages. Further, the search valid time and meta update time may correspond to a large portion of the time required for the garbage collection, and thus the victim block selected by the conventional storage device may not have the shortest garbage collection duration among the plurality of memory blocks BLK1 and BLK2.

However, in the storage device 100 according to example embodiments, not only the user cost corresponding to the time (e.g., a copyback time) of the memory accesses to the user data 270 to be performed at the garbage collection, but also the meta cost corresponding to the time (e.g., the search valid time and the meta update time) of memory accesses to the meta data 280 to be performed at the garbage collection is considered in selecting the victim block, and thus a memory block having the shortest garbage collection duration (or lowest garbage collection duration per free page) may be selected as the victim block. Accordingly, the garbage collection may be efficiently performed.

In some example embodiments, the device controller 120 may set a time period in which the garbage collection is performed based on the garbage collection cost per free page of the victim block. For example, the device controller 120 may perform the garbage collection periodically or each time a desired (or, alternatively, a predetermined) number (or a data size) of write requests are received from the host, and may set the time period for the garbage collection in proportion to the garbage collection cost per free page each time the garbage collection is performed.

The conventional storage device may set the time period for the garbage collection regardless of the garbage collection cost or by considering only the number of valid pages of the victim block. Accordingly, in the conventional storage device, the time period for one garbage collection may be set as being excessively longer than a necessary time, and thus a latency of the storage device may be increased. Alternatively, in the conventional storage device, the time period for one garbage collection may be set as being excessively shorter than the necessary time. Thus, sufficient free pages or sufficient free blocks may not be obtained, or the latency of the storage device may be increased at the next garbage collection.

However, the storage device 100 according to example embodiments may set the time period for the garbage collection using the garbage collection cost (or the garbage collection cost per free page) calculated by considering not only the user cost but also the meta cost, thereby reducing the latency (e.g., a write latency) of the storage device 100.

Figure 4:
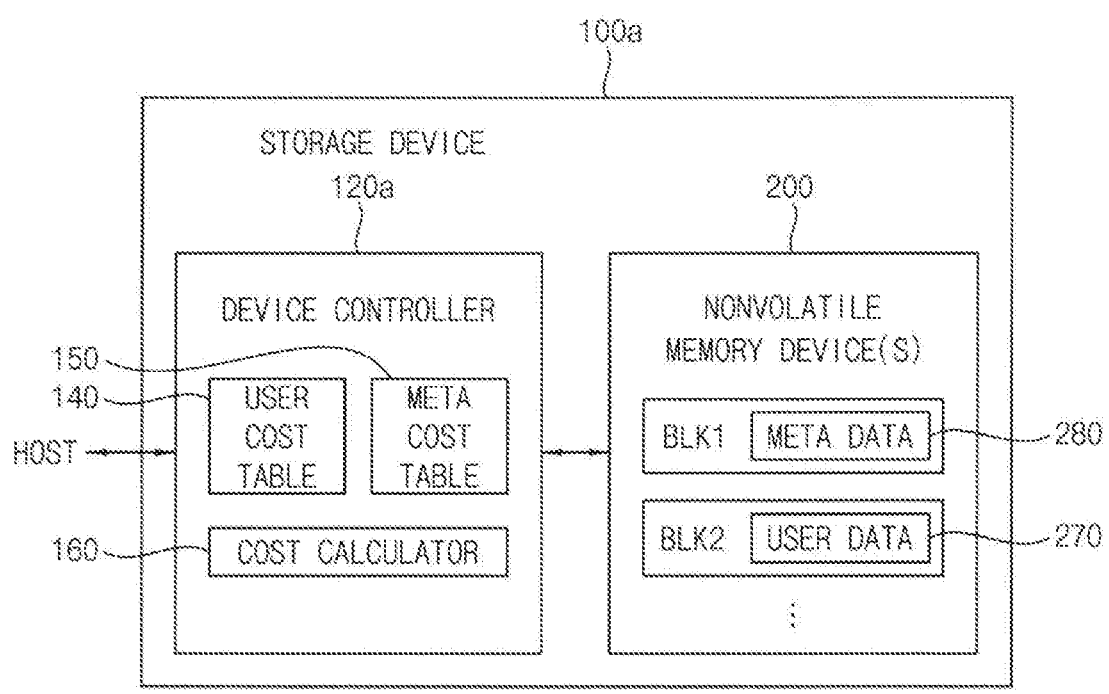
FIG. 4 is a block diagram illustrating a storage device according to example embodiments.
Figure 5A:
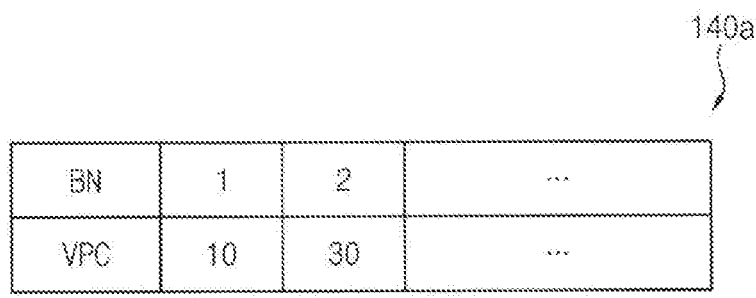
FIG. 5A is a diagram illustrating an example of a user cost table included in a storage device of FIG. 4.
Figure 5B:
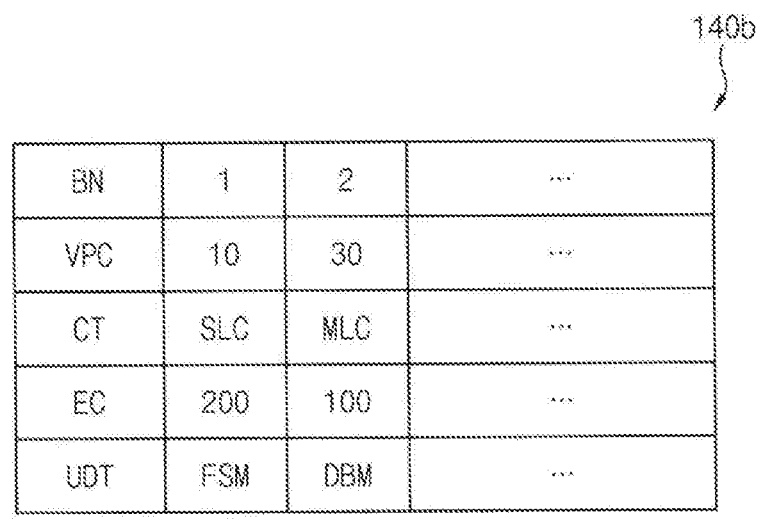
FIG. 5B is a diagram illustrating another example of a user cost table included in a storage device of FIG. 4.
Figure 6A:
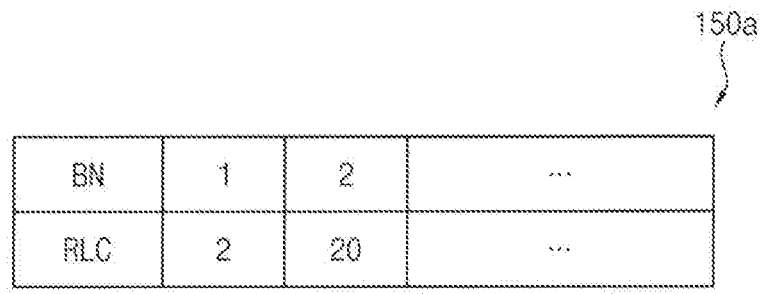
FIG. 6A is a diagram illustrating an example of a meta cost table included in a storage device of FIG. 4.
Figure 6B:
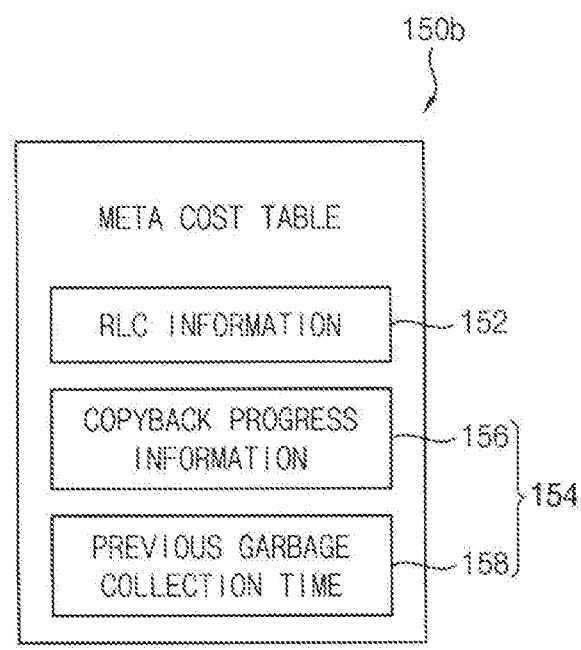
FIG. 6B is a diagram illustrating another example of a meta cost table included in a storage device of FIG. 4.

FIG. 4 is a block diagram illustrating a storage device according to example embodiments, FIG. 5A is a diagram illustrating an example of a user cost table included in a storage device of FIG. 4, FIG. 5B is a diagram illustrating another example of a user cost table included in a storage device of FIG. 4, FIG. 6A is a diagram illustrating an example of a meta cost table included in a storage device of FIG. 4, and FIG. 6B is a diagram illustrating another example of a meta cost table included in a storage device of FIG. 4.

Referring to FIG. 4, a device controller 120a of a storage device 100a according to example embodiments may include a user cost table 140 that stores user cost information, a meta cost table 150 that stores meta cost information, and a cost calculator 160 that calculate a garbage collection cost based on the user cost information and the meta cost information.

The user cost table 140 may store the user cost information for each of a plurality of memory blocks BLK1 and BLK2. In some example embodiments, the user cost table 140 may store, as the user cost information, the number of valid pages of each memory block BLK1 and BLK2. For example, as illustrated in FIG. 5A, an example user cost table 140a may store a block number BN of each memory block BLK1 and BLK2 and the number VPC of valid pages included in each memory block BLK1 and BLK2. The valid page number (or count) VPC of each memory block BLK1 and BLK2 may be recorded in the user cost table 140a when or after a write operation for each memory block BLK1 and BLK2 is performed. In an example illustrated in FIG. 5A, a first memory block BLK1 may have 10 valid pages, and a second memory block BLK2 may have 30 valid pages.

In other example embodiments, the user cost table 140 may store, as the user cost information, at least one of a cell type of each memory block BLK1 and BLK2, the number of erase operations previously performed on each memory block BLK1 and BLK2, and a type of the user data 270 stored in each memory block BLK1 and BLK2 as well as the number of valid pages of each memory block BLK1 and BLK2. For example, as illustrated in FIG. 5B, an example user cost table 140b may store a block number BN of each memory block BLK1 and BLK2, the number VPC of valid pages included in each memory block BLK1 and BLK2, a cell type CT of each memory block BLK1 and BLK2, the number EC of erase operations for each memory block BLK1 and BLK2, and a type UDT of the user data 270 stored in each memory block BLK1 and BLK2.

In an example illustrated in FIG. 5B, a first memory block BLK1 may have 10 valid pages, the first memory block BLK1 may include single level cells SLC, 200 erase operations are performed on the first memory block BLK1, and the first memory block BLK1 may store, as the user data 270, meta data FSM of a file system of a host. Further, in the example, a second memory block BLK2 may have 30 valid pages, the second memory block BLK2 may include multi-level cells MLC, 100 erase operations are performed on the second memory block BLK2, and the second memory block BLK2 may store, as the user data 270, meta data DSB of a database. Although FIG. 5B illustrates, as examples of the types of the user data 270, the meta data FSM of the file system of the host and the meta data DSB of the database, the types of the user data 270 may not be limited thereto.

The meta cost table 150 may store the meta cost information for each of a plurality of memory blocks BLK1 and BLK2. In some example embodiments, the meta cost table 150 may store, as the meta cost information, the number of L2P mapping pages related to valid pages (or having address conversion information for the valid pages) of each memory block BLK1 and BLK2. For example, as illustrated in FIG. 6A, an example meta cost table 150a may store a block number BN of each memory block BLK1 and BLK2 and the number RLC of L2P mapping pages related to valid pages included in each memory block BLK1 and BLK2. The related L2P mapping page number (or count) RLC of each memory block BLK1 and BLK2 may be recorded in the meta cost table 150a when or after a write operation for each memory block BLK1 and BLK2 is performed. In an example illustrated in FIG. 6A, address conversion information of valid pages of a first memory block BLK1 may be stored in two L2P mapping pages, and address conversion information of valid pages of a second memory block BLK2 may be stored in twenty L2P mapping pages.

In other example embodiments, the meta cost table 150 may store garbage collection progress information as well as the number of L2P mapping pages related to valid pages of each memory block BLK1 and BLK2. For example, as illustrated in FIG. 6B, an example meta cost table 150b may store information 152 about the number RLC of L2P mapping pages related to valid pages included in each memory block BLK1 and BLK2, and the garbage collection progress information 154. For example, the garbage collection progress information 154 may include, but not limited to, copyback progress information 156 representing how many valid pages of a victim block have been moved to another memory block at previous garbage collection, and a previous garbage collection time 158 representing a time period (e.g., a duration) in which previous garbage collection is performed.

The cost calculator 160 may calculate a user cost of each of the plurality of memory blocks BLK1 and BLK2 based on the user cost information stored in the user cost table 140. In some example embodiments, the user cost table 140 may store the valid page count VPC of each memory block BLK1 and BLK2, and the cost calculator 160 may calculate the user cost of each of the plurality of memory blocks BLK1 and BLK2 using an equation, "tUC=(tURD+tUPROG)*VPC", where tURD may represent a time for reading one page of the user data 270, tUPROG may represent a time for programming one page of the user data 270, VPC may represent the number of valid pages of each memory block BLK1 and BLK2, and tUC may represent the user cost. That is, the cost calculator 160 may calculate the user cost (tUC) of each memory block BLK1 and BLK2 by multiplying a sum of a determined (or, alternatively, a predetermined) user data page read time (tURD) and a determined (or, alternatively, predetermined) user data page program time (tUPROG) by the valid page count VPC stored in the user cost table 140. In other example embodiments, not only the valid page count VPC, but also at least one of the cell type CT, the erase count EC and the type of the user data 270 of each memory block BLK1 and BLK2 may be considered in calculating the user cost.

Further, the cost calculator 160 may calculate a meta cost of each of the plurality of memory blocks BLK1 and BLK2 based on the meta cost information stored in the meta cost table 150. In some example embodiments, the meta cost table 150 may store the related L2P mapping page count RLC of each memory block BLK1 and BLK2, and the cost calculator 160 may calculate the meta cost of each of the plurality of memory blocks BLK1 and BLK2 using an equation, "tMC=(tMRD+tMPROG)*RLC", where tMRD may represent a time for reading one page of the meta data 280, tMPROG may represent a time for programming one page of the meta data 280, RLC may represent the number of L2P mapping pages related to valid pages of each memory block BLK1 and BLK2, and tMC may represent the meta cost. That is, the cost calculator 160 may calculate the meta cost (tMC) of each memory block BLK1 and BLK2 by multiplying a sum of a determined (or, alternatively, a predetermined) meta data page read time (tMRD) and a determined (or, alternatively, a predetermined) meta data page program time (tMPROG) by the related L2P mapping page count RLC stored in the meta cost table 150. In other example embodiments, not only the related L2P mapping page count RLC, but also the garbage collection progress information 154 may be considered in calculating the meta cost.

The cost calculator 160 may calculate a garbage collection cost per free page of each of the plurality of memory blocks BLK1 and BLK2 based on the user cost and the meta cost. In some example embodiments, the cost calculator 160 may calculate the garbage collection cost per free page of each of the plurality of memory blocks BLK1 and BLK2 using an equation, "tGCCPP=(tUC+tMC)/(TPC−VPC)", where tUC may represent the user cost of each memory block BLK1 and BLK2, tMC may represent the meta cost of each memory block BLK1 and BLK2, TPC may represent the number of total pages of each memory block BLK1 and BLK2, VPC may represent the number of valid pages of each memory block BLK1 and BLK2, and tGCCPP may represent the garbage collection cost per free page. That is, the cost calculator 160 may calculate the garbage collection cost per free page (tGCCPP) by dividing a sum of the user cost (tUC) and the meta cost (tMC) by the invalid page number (or TPC−VPC).

The device controller 120a may select a memory block having the lowest garbage collection cost per free page (tGCCPP) as the victim block among the plurality of memory blocks BLK1 and BLK2, and may perform the garbage collection on the victim block. Accordingly, the victim block may be selected such that the greatest number of free pages can be obtained within a limited time, and the garbage collection may be efficiently performed.

Figure 7:
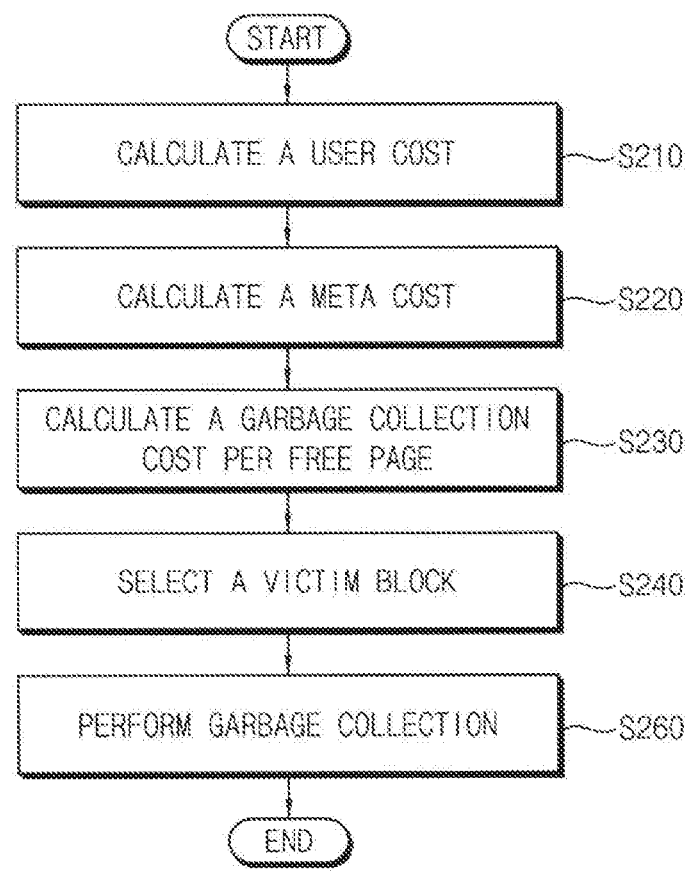
FIG. 7 is a flowchart illustrating a garbage collection method of a storage device according to example embodiments.
Figures 8, 9:
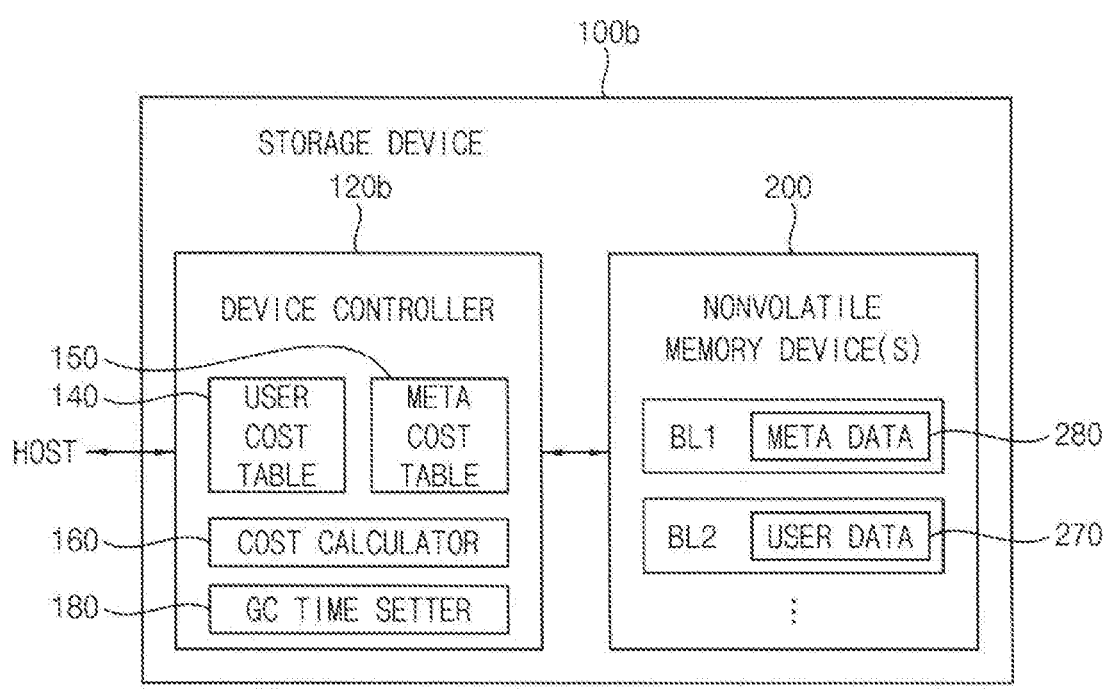
FIG. 8 is a diagram for describing an example of selecting a victim block in a garbage collection method of FIG. 7.
FIG. 9 is a block diagram illustrating a storage device according to example embodiments.

FIG. 7 is a flowchart illustrating a garbage collection method of a storage device according to example embodiments, and FIG. 8 is a diagram for describing an example of selecting a victim block in a garbage collection method of FIG. 7.

Referring to FIGS. 4 and 7, in operation S210, a cost calculator 160 may calculate a user cost of each of a plurality of memory blocks BLK1 and BLK2 based on user cost information stored in a user cost table 140. For example, the cost calculator 160 may calculate the user cost of each memory block BLK1 and BLK2 by multiplying a sum of a user data page read time and a user data page program time by a valid page count stored in the user cost table 140.

In operation S220, the cost calculator 160 may calculate a meta cost of each of the plurality of memory blocks BLK1 and BLK2 based on meta cost information stored in a meta cost table 150. For example, the cost calculator 160 may calculate the meta cost of each memory block BLK1 and BLK2 by multiplying a sum of a meta data page read time and a meta data page program time by a related L2P mapping page count stored in the meta cost table 150.

In operation S230, the cost calculator 160 may calculate a garbage collection cost per free page of each of the plurality of memory blocks BLK1 and BLK2 based on the user cost and the meta cost. For example, the cost calculator 160 may calculate the garbage collection cost per free page of each memory block BLK1 and BLK2 by dividing a sum of the user cost and the meta cost by the invalid page number.

In operation S240, the device controller 120a may select a memory block having the lowest garbage collection cost per free page as a victim block among the plurality of memory blocks BLK1 and BLK2.

In operation S250, the device controller 120a may perform garbage collection on the selected victim block.

In an example illustrated in FIG. 8 where a first memory block BLKA have 100 valid pages, address conversion information for the valid pages of the first memory block BLKA is stored in 50 L2P mapping pages, a second memory block BLKB have 110 valid pages, address conversion information for the valid pages of the second memory block BLKB is stored in 5 L2P mapping pages, a conventional storage device considering only the valid page count VPC may select the first memory block BLKA having the least valid pages. However, although the first memory block BLKA has the least valid pages, 50 L2P mapping pages may be read and 50 updated L2P mapping pages may be programmed after a copyback operation in a case where garbage collection is performed on the first memory block BLKA, but only 5 L2P mapping pages may be read and 5 updated L2P mapping pages may be programmed after the copyback operation in a case where the garbage collection is performed on the second memory block BLKB. Thus, a garbage collection cost or a garbage collection cost per free page for the first memory block BLKA may be greater than a garbage collection cost or a garbage collection cost per free page for the second memory block BLKB. In the garbage collection method according to example embodiments, the garbage collection cost per free page may be calculated by considering not only the user cost calculated based on the valid page count VPC but also the meta cost calculated based on the related L2P mapping page count RLC, and thus a memory block having the lowest garbage collection cost per free page, or the second memory block BLKB in the example of FIG. 8 may be selected as the victim block. Accordingly, in the garbage collection method according to example embodiments, the garbage collection may be efficiently performed.

Figure 10:
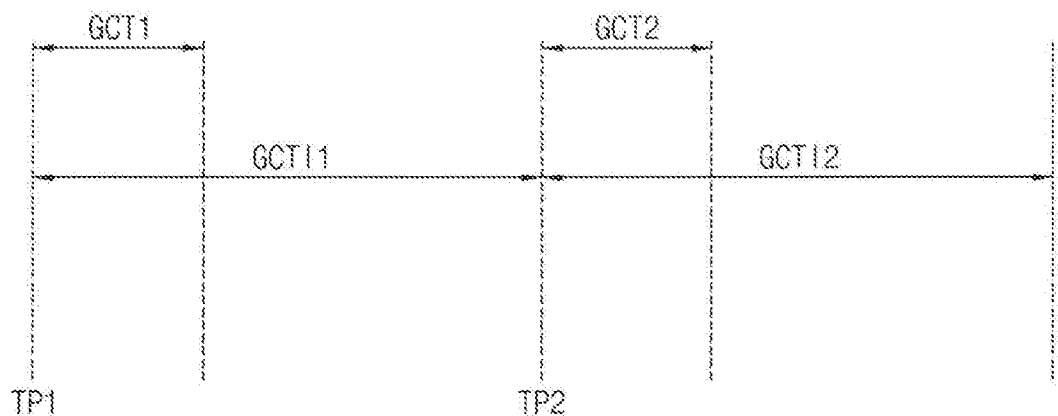
FIG. 10 is a diagram for describing an example of setting a garbage collection time by a storage device of FIG. 9.

FIG. 9 is a block diagram illustrating a storage device according to example embodiments, and FIG. 10 is a diagram for describing an example of setting a garbage collection time by a storage device of FIG. 9.

Compared with a device controller 120a of a storage device 100a of FIG. 4, a device controller 120b of a storage device 100b of FIG. 9 may further include a garbage collection time setter 180 that sets a time period in which garbage collection is performed based on a garbage collection cost per free page of a victim block.

The garbage collection time setter 180 may set the time period for the garbage collection based on the garbage collection cost per free page of the victim block calculated by the cost calculator 160 and the number of pages of user data 270 for which write operations are requested during a time interval between adjacent garbage collections. That is, while the storage device 100b operates, the device controller 120b may perform the garbage collection periodically or each time a desired (or, alternatively, predetermined) number (or data size) of write requests are received from a host, and may set the time period for the garbage collection in proportion to the garbage collection cost per free page and the number of pages for which write operations are requested each time the garbage collection is performed.

For example, in an example of FIG. 10, the device controller 120b may perform first garbage collection for a first time period GCT1 from a first time point TP1, and thereafter may perform second garbage collection at a second time point TP2. In an example, the garbage collection time setter 180 may set a length of a second time period GCT2 for the second garbage collection based on the garbage collection cost per free page and the number of pages for which the write operations are requested during a time interval GCTI1 between the first and second garbage collections. In another example, the garbage collection time setter 180 may predict the number of pages for which the write operations are requested during the next time interval GCTI2, and may set the length of the second time period GCT2 for the second garbage collection based on the garbage collection cost per free page and the predicted number of write requested pages.

In some example embodiments, the garbage collection time setter 180 may set the time period for the garbage collection using an equation, "tGC=tGCCPP*WPC", where tGCCPP may represent the garbage collection cost per free page, WPC may represent the number of pages of the user data 270 for which write operations are requested during a time interval between adjacent garbage collections, and tGC may represent the time period for the garbage collection. Accordingly, since the time period for the garbage collection may be set by considering both of a time in which each free page is obtained and write requests for the pages of the user data 270, a rate of obtaining new free pages may match with a rate of using free pages.

Figure 11:
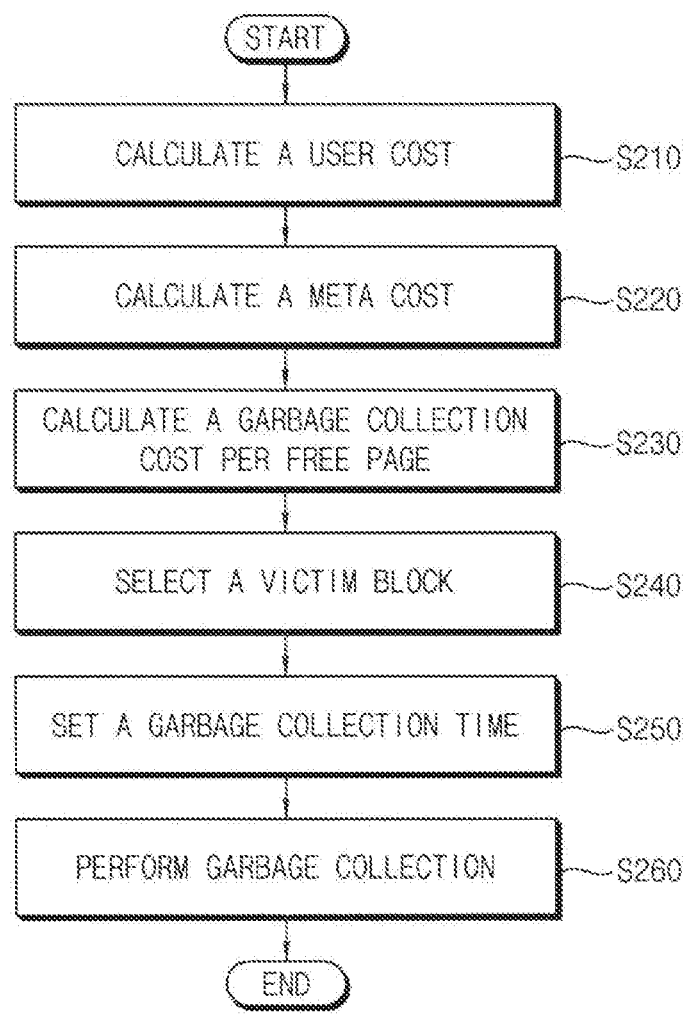
FIG. 11 is a flowchart illustrating a garbage collection method of a storage device according to example embodiments.
Figures 12A, 12B:
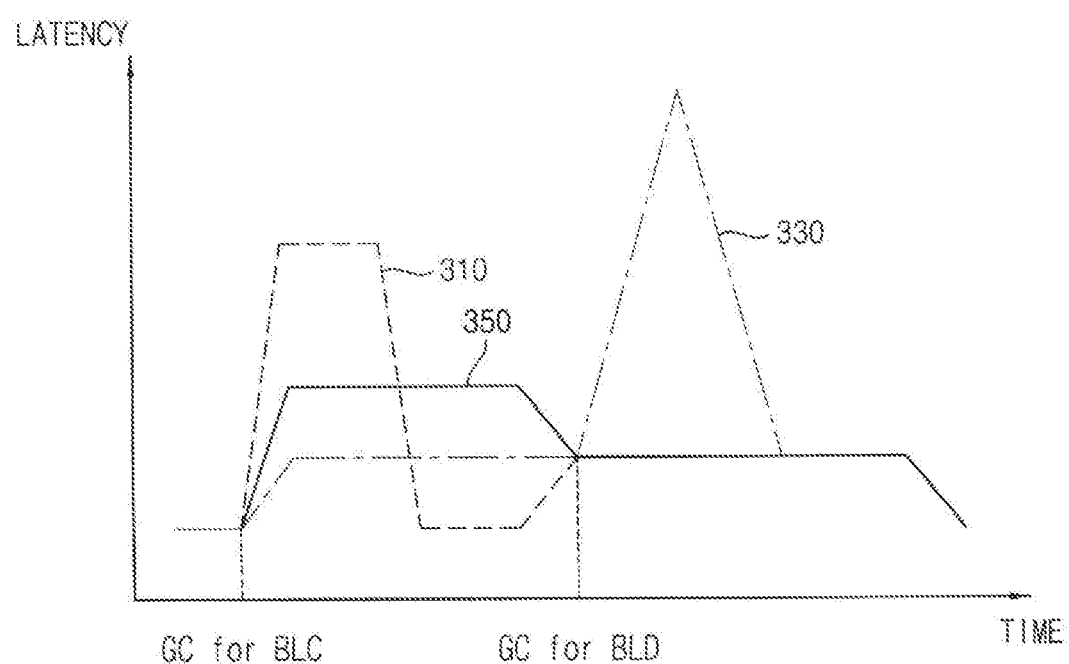
FIGS. 12A and 12B are diagrams for describing examples of garbage collection times of a conventional garbage collection method and a garbage collection method according to example embodiments.

FIG. 11 is a flowchart illustrating a garbage collection method of a storage device according to example embodiments, and FIGS. 12A and 12B are diagrams for describing examples of garbage collection times of a conventional garbage collection method and a garbage collection method according to example embodiments.

Compared with a garbage collection method of FIG. 7, in a garbage collection method of FIG. 11, a garbage collection time or a time period in which garbage collection is performed may be set.

For example, referring to FIGS. 9 and 11, in operation S250, a garbage collection time setter 180 may set the time period for the garbage collection based on a garbage collection cost per free page of a victim block calculated by a cost calculator 160 and the number of pages of user data 270 for which write operations are requested during a time interval between adjacent garbage collections. For example, the garbage collection time setter 180 may set the time period for the garbage collection (hereinafter, referred to as a "garbage collection time") by multiplying the garbage collection cost per free page by the number of write requested pages.

In an example illustrated in FIGS. 12A and 12B, first garbage collection may be performed on a first memory block BLKC, and then second garbage collection may be performed on a second memory block BLKD. A conventional storage device that sets the time period for each garbage collection by considering only a valid page count VPC may set the same garbage collection time for the first and second garbage collections for the first and second memory blocks BLKC and BLKD having the same valid page count VPC. In an example where the conventional storage device sets the garbage collection time for the first garbage collection as being excessively longer than a necessary time, as indicated by 310 in FIG. 12B, a latency (e.g., a write latency corresponding to a sum of a write time and a garbage collection time) of the conventional storage device may be excessively increased during the first garbage collection. In another example where the conventional storage device sets the garbage collection time for the first garbage collection as being excessively shorter than the necessary time, as indicated by 330 in FIG. 12B, the garbage collection time for the second garbage collection should be set as being excessively long since sufficient free pages are not obtained at the first garbage collection, and thus the latency of the conventional storage device may be excessively increased during the second garbage collection. However, in the garbage collection method according to example embodiments, since the garbage collection time may be set by considering both of the garbage collection cost calculated based on a user cost and a meta cost and the number of the write requested pages, as indicated by 350 in FIG. 12B, the garbage collection time may be properly set, and the latency of a storage device 100 may be reduced.

Figure 13A:
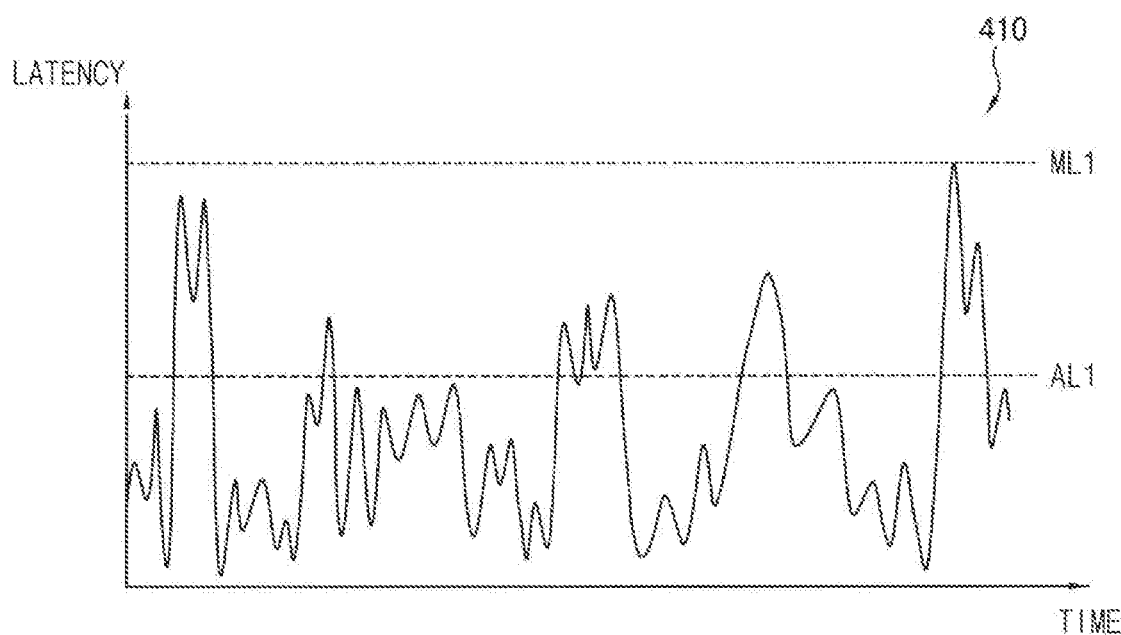
FIG. 13A is a diagram illustrating an example of a simulation for a latency of a conventional storage device.
Figure 13B:
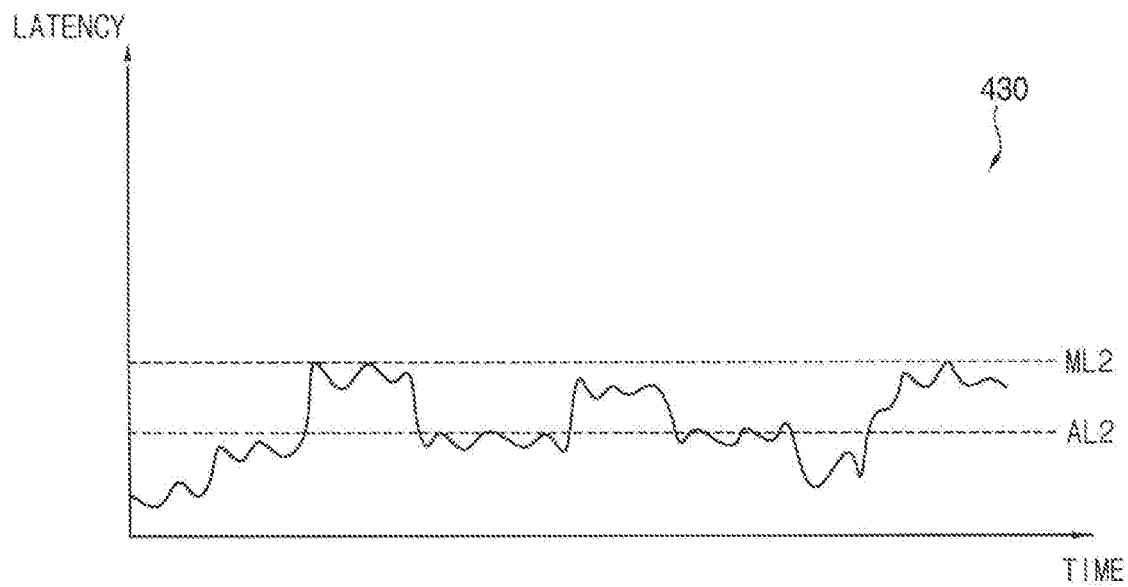
FIG. 13B is a diagram illustrating an example of a simulation for a latency of a storage device according to example embodiments.

FIG. 13A is a diagram illustrating an example of a simulation for a latency of a conventional storage device, and FIG. 13B is a diagram illustrating an example of a simulation for a latency of a storage device according to example embodiments.

Referring to FIGS. 13A and 13B, compared with a latency 410 of a conventional storage device that selects a victim block and sets a garbage collection time by considering only a valid page count, a storage device according to example embodiments that selects the victim block and sets the garbage collection time by considering not only a user cost but also a meta cost may have a shorter latency 430.

For example, the storage device according to example embodiments may select a memory block having the lowest garbage collection cost per free page as the victim block by considering not only the user cost but also the meta cost, and thus may have an average latency AL2 shorter than an average latency AL1 of the conventional storage device that may select a memory block having a relatively high garbage collection cost per free page.

Further, the storage device according to example embodiments may set a garbage collection time by considering the garbage collection cost per free and the number of write requested pages such that a rate of obtaining new free pages may substantially match with a rate of using free pages, and thus may have a maximum latency ML2 shorter than a maximum latency AL1 of the conventional storage device that may set the garbage collection time as being excessively long.

Figure 14:
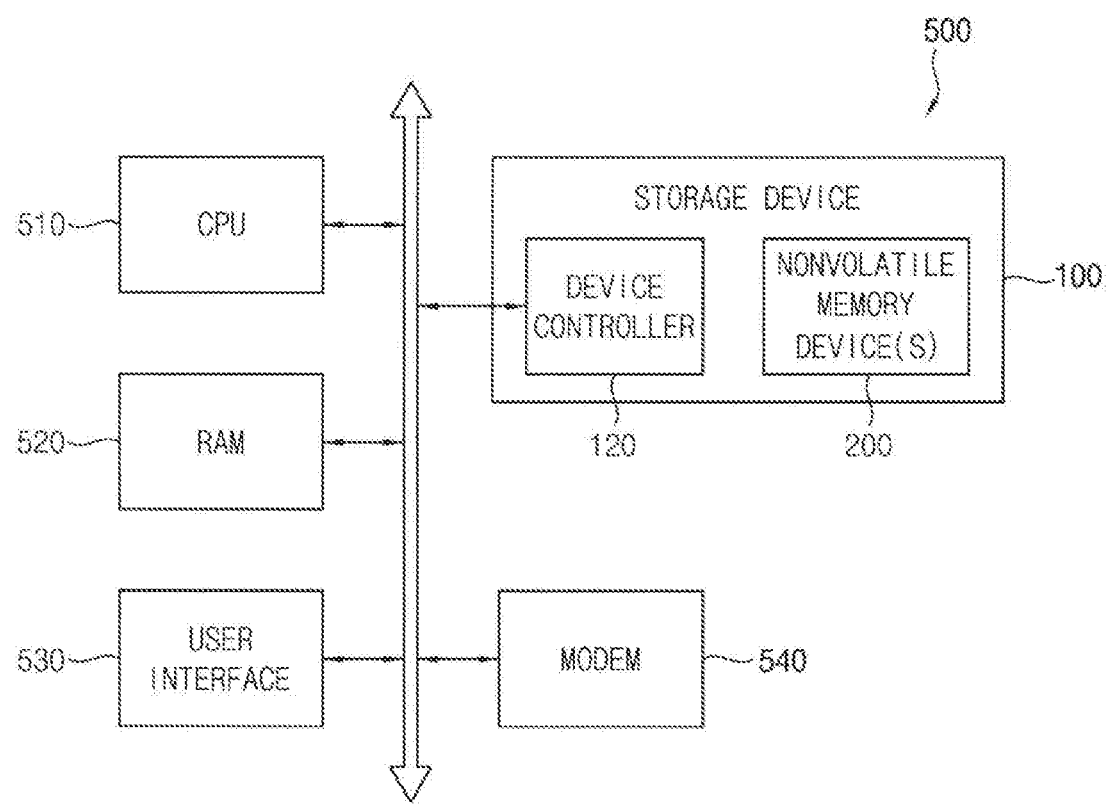
FIG. 14 is a block diagram illustrating a computing system including a storage device according to example embodiments.

FIG. 14 is a block diagram illustrating a computing system including a storage device according to example embodiments.

Referring to FIG. 14, a computing system 500 may include a central processing unit (CPU) 510, a random access memory (RAM) 520, a user interface 530, a modem 540 and a storage device 100. In some example embodiments, the computing system 500 may further include an application chipset, a camera image processor (CIS), a mobile DRAM, etc. According to example embodiments, the storage device 100 may be an SSD, an NVMe, an eMMC, a UFS, etc.

The storage device 100 may include at least one nonvolatile memory device 200 and a device controller 120 for controlling the nonvolatile memory device 200. The device controller 120 may select a memory block having the lowest garbage collection cost per free page as a victim block by calculating not only a user cost but also a meta cost, thereby efficiently performing garbage collection. Further, the device controller 120 may set a time period for the garbage collection by using the garbage collection cost per free page, thereby reducing a latency (e.g., a write latency) of the storage device 100.

Example embodiments of the inventive concepts may be applied to any storage device including a nonvolatile memory device. For example, example embodiments of the inventive concepts may be applied to an SSD, an NVMe, an eMMC, a UFS, etc.

According to one or more example embodiments, the units and/or devices described above including elements of the storage device 100, 100a, 100b such as the device controller and sub-elements thereof such as the cost calculator 160 and GC time setter 180 may be implemented using hardware, a combination of hardware and software, or a non-transitory storage medium storing software that is executable to perform the functions of the same.

Hardware may be implemented using processing circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, etc., capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., one or more processors, CPUs, controllers, ALUs, DSPs, microcomputers, microprocessors, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor. In another example, the hardware device may be an integrated circuit customized into special purpose processing circuitry (e.g., an ASIC).

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Software and/or data may be embodied permanently or temporarily in any type of storage media including, but not limited to, any machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including tangible or non-transitory computer-readable storage media as discussed herein.

Storage media may also include one or more storage devices at units and/or devices according to one or more example embodiments. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the storage media, the computer programs, program code, instructions, or some combination thereof, may be specially designed and constructed for the purposes of the example embodiments, or they may be known devices that are altered and/or modified for the purposes of example embodiments.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of example embodiments of the present inventive concepts. Accordingly, all such modifications are intended to be included within the scope of example embodiments of the present inventive concepts as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage device comprising:
   at least one nonvolatile memory device including a plurality of memory blocks, the nonvolatile memory device configured to store user data and meta data in the plurality of memory blocks; and
   a device controller configured to,
      calculate a user cost corresponding to a time of memory accesses to the user data during garbage collection within the plurality of memory blocks based on at least (i) a time for reading one page of the user data and (ii) a time for programming one page of the user data,
      calculate a meta cost corresponding to a time of memory accesses to the meta data during the garbage collection within the plurality of memory blocks based on at least (i) a time for reading one page of the meta data and (ii) a time for programming one page of the meta data,
      select a victim block among the plurality of memory blocks based on the user cost and the meta cost, and
      perform the garbage collection on the victim block,
   wherein the device controller is configured to calculate a garbage collection cost per free page of each of the plurality of memory blocks based on tGCCPP=(tUC+tMC)/(TPC−VPC), wherein
      tUC represents the user cost of each of the plurality of memory blocks, tMC represents the meta cost of each of the plurality of memory blocks, TPC represents a number of total pages of each memory block, VPC represents a number of valid pages of each memory block, and tGCCPP represents the garbage collection cost per free page.

2. The storage device of claim 1, wherein the device controller is configured to,
   calculate, with respect to each of the plurality of memory blocks, the garbage collection cost per free page based on a sum of the user cost and the meta cost and a number of invalid pages of each memory block, and
   select one of the plurality of memory blocks having a lowest garbage collection cost per free page as the victim block.

3. The storage device of claim 2, wherein the device controller is configured to set a time period for the garbage collection based on the garbage collection cost per free page of the victim block.

4. The storage device of claim 3, wherein the device controller sets the time period for the garbage collection based on tGC=tGCCPP*WPC", wherein
   tGCCPP represents the garbage collection cost per free page, WPC represents a number of pages of the user data for which write operations are requested during a time interval between adjacent garbage collections, and tGC represents the time period for the garbage collection.

5. The storage device of claim 1, wherein the device controller is configured to calculate the user cost based on at least one of the number of valid pages of each memory block, a cell type of each memory block, a number of erase operations of each memory block, and a type of the user data stored in each memory block.

6. The storage device of claim 1, wherein the device controller is configured to calculate the user cost of each of the plurality of memory blocks based on tUC=(tURD+tUPROG)*VPC, wherein
   tURD represents the time for reading one page of the user data, tUPROG represents the time for programming one page of the user data, VPC represents the number of valid pages of each memory block, and tUC represents the user cost.

7. The storage device of claim 1, wherein the device controller is configured to calculate the meta cost based on at least one of a number of logical-to-physical (L2P) mapping pages related to valid pages of each of the plurality of memory blocks, and garbage collection progress information.

8. The storage device of claim 1, wherein the device controller is configured to calculate the meta cost of each of the plurality of memory blocks based on tMC=(tMRD+tMPROG)*RLC, wherein
   tMRD represents the time for reading one page of the meta data, tMPROG represents the time for programming one page of the meta data, RLC represents a number of logical-to-physical (L2P) mapping pages related to valid pages of each memory block, and tMC represents the meta cost.

9. The storage device of claim 1, wherein the device controller includes,
   at least one memory configured to store,
      user cost information for each of the plurality of memory blocks,
      meta cost information for each of the plurality of memory blocks; and
   processing circuitry configured to,
      calculate the user cost of each of the plurality of memory blocks based on the user cost information stored in the at least one memory,
      calculate the meta cost of each of the plurality of memory blocks based on the meta cost information stored in the at least one memory, and
      calculate the garbage collection cost per free page of each of the plurality of memory blocks based on the user cost and the meta cost.

10. The storage device of claim 9, wherein the user cost information includes the number of valid pages of each memory block.

11. The storage device of claim 10, wherein the user cost information further includes at least one of a cell type of each memory block, a number of erase operations of each memory block, and a type of the user data stored in each memory block.

12. The storage device of claim 9, wherein the meta cost information includes a number of logical-to-physical (L2P) mapping pages related to valid pages of each memory block.

13. The storage device of claim 12, wherein the meta cost information further includes garbage collection progress information.

14. The storage device of claim 9, wherein the processing circuitry is further configured to set a time period for the garbage collection based on the garbage collection cost per free page of the victim block and a number of pages of the user data for which write operations are requested during a time interval between adjacent garbage collections.

15. A storage device comprising:
   at least one nonvolatile memory device including a plurality of memory blocks, the nonvolatile memory device configured to store user data and meta data in the plurality of memory blocks; and a device controller configured to control the nonvolatile memory device, the device controller including,
  at least one memory configured to store user cost information for each of the plurality of memory blocks, and to store meta cost information for each of the plurality of memory blocks, and
  processing circuitry configured to,
    calculate a user cost corresponding to a time of memory accesses to the user data during garbage collection within the plurality of memory blocks based on the user cost information based on at least (i) a time for reading one page of the user data and (ii) a time for programming one page of the user data,
    calculate a meta cost corresponding to a time of memory accesses to the meta data during the garbage collection within the plurality of memory blocks based on the meta cost information based on at least (i) a time for reading one page of the meta data and (ii) a time for programming one page of the meta data,
    calculate a garbage collection cost per free page of each of the plurality of memory blocks based on the user cost and the meta cost, and
    select one of the plurality of memory blocks having a lowest garbage collection cost per free page as a victim block,
  wherein the device controller is configured to calculate the garbage collection cost per free page of each of the plurality of memory blocks based on tGCCPP= (tUC+tMC)/(TPC−VPC), wherein
    tUC represents the user cost of each of the plurality of memory blocks, tMC represents the meta cost of each of the plurality of memory blocks, TPC represents a number of total pages of each memory block, VPC represents a number of valid pages of each memory block, and tGCCPP represents the garbage collection cost per free page.

16. The storage device of claim 15, wherein
  the user cost information stored in the at least one memory includes at least one of the number of valid pages of each memory block, a cell type of each memory block, a number of erase operations of each memory block, and a type of the user data stored in each memory block, and
  the meta cost information stored in the at least one memory includes at least one of a number of logical-to-physical (L2P) mapping pages related to valid pages of each of the plurality of memory blocks, and garbage collection progress information.

17. The storage device of claim 15, wherein the processing circuitry is further configured to set a time period for the garbage collection based on the garbage collection cost per free page of the victim block and a number of pages of the user data for which write operations are requested during a time interval between adjacent garbage collections.

18. A garbage collection method of a storage device, the storage device including at least one nonvolatile memory device including a plurality of memory blocks, the method comprising:
  calculating a user cost corresponding to a time of memory accesses to user data stored in the nonvolatile memory device during garbage collection within the plurality of memory blocks based on at least (i) a time for reading one page of the user data and (ii) a time for programming one page of the user data;
  calculating a meta cost corresponding to a time of memory accesses to meta data stored in the nonvolatile memory device during the garbage collection within the plurality of memory blocks based on at least (i) a time for reading one page of the meta data and (ii) a time for programming one page of the meta data;
  calculating a garbage collection cost per free page of each of the plurality of memory blocks based on the user cost and the meta cost;
  selecting one of the plurality of memory blocks having a lowest garbage collection cost per free page as a victim block; and
  performing the garbage collection on the victim block,
  wherein the garbage collection cost per free page of each of the plurality of memory blocks is calculated based on tGCCPP=(tUC+tMC)/(TPC−VPC), wherein
    tUC represents the user cost of each of the plurality of memory blocks, tMC represents the meta cost of each of the plurality of memory blocks, TPC represents a number of total pages of each memory block, VPC represents a number of valid pages of each memory block, and tGCCPP represents the garbage collection cost per free page.

19. The method of claim 18, further comprising:
  setting a time period for the garbage collection based on the garbage collection cost per free page of the victim block.

* * * * *